US010838974B2

(12) United States Patent
Anderson et al.

(10) Patent No.: US 10,838,974 B2
(45) Date of Patent: Nov. 17, 2020

(54) CUSTOM OBJECT-IN-MEMORY FORMAT IN DATA GRID NETWORK APPLIANCE

(71) Applicant: International Business Machines Corporation, Armonk, NY (US)

(72) Inventors: Jared H. Anderson, Rochester, MN (US); Christopher D. Johnson, Rochester, MN (US); Frederick A. Kulack, Rochester, MN (US); William T. Newport, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1101 days.

(21) Appl. No.: 15/243,726

(22) Filed: Aug. 22, 2016

(65) Prior Publication Data

US 2016/0357837 A1    Dec. 8, 2016

Related U.S. Application Data

(63) Continuation of application No. 13/584,871, filed on Aug. 14, 2012.

(51) Int. Cl.
*G06F 17/00* (2019.01)
*G06F 16/25* (2019.01)
(Continued)

(52) U.S. Cl.
CPC .......... *G06F 16/258* (2019.01); *G06F 16/289* (2019.01); *H02J 13/00001* (2020.01); *Y04S 10/40* (2013.01)

(58) Field of Classification Search
CPC ................. G06F 16/258; G06F 16/289; H02J 13/00001; Y04S 10/40
See application file for complete search history.

(56) References Cited

U.S. PATENT DOCUMENTS 5,386,564 A * 1/1995 Shearer .................. G06F 9/543
5,835,970 A   11/1998 Landry et al.
(Continued)

FOREIGN PATENT DOCUMENTS

WO      2004081712 A2     9/2004

OTHER PUBLICATIONS

Radford, M. et al., "An Information Grid Solution using Avaki Data Grid Software," ibm.com/redbooks/REDP3853 . . . .
(Continued)

*Primary Examiner* — Tyler J Torgrimson
(74) *Attorney, Agent, or Firm* — Patterson + Sheridan, LLP

(57) ABSTRACT

Techniques are disclosed for implementing custom object-in-memory formats in a data grid network appliance. The techniques include maintaining a record of format definitions on a client device of the data grid and a corresponding record of format definitions on a server device of the data grid. Each format definition may indicate one or more attributes of an object class and data types and byte ranges of the attributes. The client device may serialize one or more objects for storage in the data grid based on respective format definitions associated with the one or more objects and retrieved from the record of format definitions maintained on the client device. Further, the server device may perform one or more data grid operations using format definitions retrieved from the record of format definitions maintained on the server device.

20 Claims, 11 Drawing Sheets

(51) Int. Cl.
*G06F 16/28* (2019.01)
*H02J 13/00* (2006.01)

(56) References Cited

U.S. PATENT DOCUMENTS

| | | | |
|---|---|---|---|
| 5,838,970 A | 11/1998 | Thomas | |
| 5,872,973 A * | 2/1999 | Mitchell | G06F 9/465 |
| | | | 717/108 |
| 5,893,077 A | 4/1999 | Griffin | |
| 6,810,429 B1 * | 10/2004 | Walsh | G06F 16/258 |
| | | | 709/246 |
| 6,988,098 B2 | 1/2006 | Sonkin et al. | |
| 7,190,284 B1 | 3/2007 | Dye et al. | |
| 7,287,035 B2 | 10/2007 | Madan et al. | |
| 7,761,484 B2 | 7/2010 | Christensen et al. | |
| 2002/0133497 A1 | 9/2002 | Draper et al. | |
| 2002/0199014 A1 | 12/2002 | Yang et al. | |
| 2004/0166857 A1 | 8/2004 | Shim et al. | |
| 2005/0187908 A1 | 8/2005 | Madan et al. | |
| 2006/0085457 A1 | 4/2006 | Gelfand | |
| 2009/0282206 A1 | 11/2009 | Goldstein et al. | |
| 2011/0040801 A1 | 2/2011 | Macaleer et al. | |
| 2011/0239185 A1 * | 9/2011 | Brown | G06F 40/205 |
| | | | 717/105 |
| 2012/0086963 A1 * | 4/2012 | Fujitsuka | G06Q 10/10 |
| | | | 358/1.11 |
| 2012/0278817 A1 | 11/2012 | Oliver et al. | |
| 2013/0097615 A1 | 4/2013 | Falco et al. | |

OTHER PUBLICATIONS

List of IBM Patents or Patent Applications Treated as Related, dated Aug. 23, 2016.

* cited by examiner

CUSTOM OBJECT-IN-MEMORY FORMAT IN DATA GRID NETWORK APPLIANCE

CROSS-REFERENCE TO RELATED APPLICATIONS

This application is a continuation of U.S. patent application Ser. No. 13/584,871, filed Aug. 14, 2012. The aforementioned related patent application is herein incorporated by reference in its entirety.

BACKGROUND

Field of the Invention

The present invention generally relates to data grid network appliances, and, more specifically, to techniques for storing and using objects having custom object-in-memory formats in data grid network appliances.

Description of Related Art

Object serialization, also called "deflating" or "marshalling" an object, converts the object into a serial sequence of bytes (i.e., a binary byte buffer, also referred to herein as a "binary object"). A serializer may, for example, translate field and reference values, but not additional object overhead, of the object to a binary byte buffer. The byte buffer may later be de-serialized, also called "inflating" or "de-marshalling" the object, to create an object having an identical internal state as the original. In particular, the byte buffer may be translated back into field and reference values and inserted into a new object to create the object having an identical state.

In-memory data grids have been used to store application data in memory across a grid of processing elements. In network appliances which provide data grid services to client applications, client objects (e.g., Java® or .NET® objects) may be serialized to byte buffers and stored as such in the data grid. By serializing objects to byte buffers, fewer memory allocations may be required, and the objects may consume less storage, because, for example, object overhead may be absent from the byte buffers. Further, because code need not be stored in raw byte buffers, the byte buffers may be language neutral.

One approach for storing serialized objects on network appliances uses a portable object format (POF) that strictly defines data representations. That is, the POF mandates a format for binary representations of objects. As a result, the POF may be inefficient where, for example, the native, application-level format of the object must be converted to the mandated format. Further, because the format is mandated, objects cannot be serialized using custom formats (e.g., compressed or encrypted formats), which may be more desired and/or more efficient than the mandated format.

SUMMARY

One embodiment of the invention includes a method for implementing custom object-in-memory formats in a data grid network appliance. The method includes maintaining, via one or more processors, a record of format definitions on a client device of the data grid and a corresponding record of format definitions on a server device of the data grid. Each format definition indicate one or more attributes of an object class and data types and byte ranges of the attributes. The techniques further include serializing, by the client device, one or more objects for storage in the data grid based on respective format definitions associated with the one or more objects and retrieved from the record of format definitions maintained on the client device, and performing one or more data grid operations by the server device using format definitions retrieved from the record of format definitions maintained on the server device.

Advantageously, custom in-memory formats (e.g., compressed or encrypted formats) are supported by the methods discussed. Such custom formats may be more desirable and/or more efficient than a mandated format. For example, objects stored using a custom compressed format may require less storage space than the mandated format.

Further embodiments of the present invention include a computer-readable storage medium storing instructions that, when executed by a computer system, cause the computer system to perform one or more aspects of the disclosed techniques, and a system programmed to carry out one or more aspects of the disclosed techniques.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
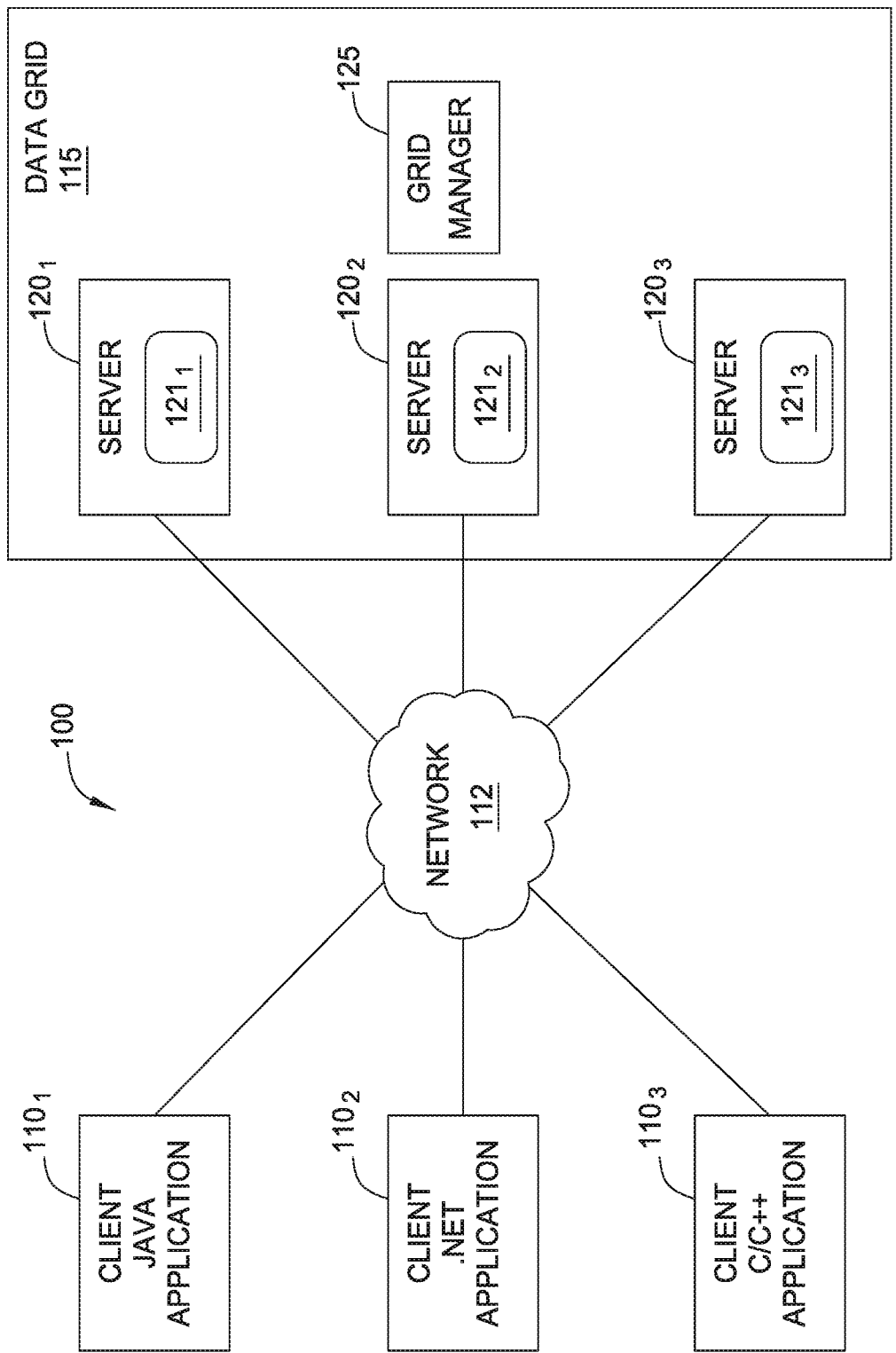
FIG. 1 illustrates a system configured to provide data grid services to client applications, according to one embodiment of the invention.

Embodiments discussed herein permit an application object to be serialized to a byte buffer based on a custom in-memory object format definition. To serialize an object the format definition associated with the object is identified.

In general, the object format definition may indicate attributes and sub-attributes of the object and types and byte ranges for the attributes and sub-attributes, and a format manager may keep track of object format definitions for various object types. The object is converted to a binary byte buffer by looping through the attributes and sub-attributes in order indicated by the object format definition and: extracting the value of the attribute or sub-attribute from the object; converting the extracted value to binary bytes; and appending the binary bytes to the byte buffer.

Embodiments presented herein permit querying, indexing, grid access, and similar operations using custom in-memory object formats. Object format definitions may be used to perform such operations by, for example, indicating which bytes of a binary byte buffer correspond to particular attributes for extraction, comparison, etc.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a system 100 configured to provide data grid services to client applications, according to one embodiment. As shown, the system 100 includes client applications $110_{1-3}$ connected to an in-memory data grid 115 via a network 112. Illustratively, each of the client applications $110_{1-3}$ is written in a different object-oriented programming language: client application $110_1$ is a Java® application, client application $110_2$ is a .NET® application, and client application $110_3$ is a C/C++ application. During execution, the client applications $110_{1-3}$ may create objects, serialize the objects to binary byte buffers, and store the byte buffers in the data grid 115. As used herein, "object" refers to a data structure including fields (a.k.a., variables) which store the state of the object and methods (a.k.a. functions) which expose the behavior of the object.

The data grid 115 includes multiple grid processes $121_{1-3}$ running on multiple server systems $120_{1-3}$. To the client applications $110_{1-3}$, the data grid 115 as a whole appears to be a single no-SQL data store. The servers $120_{1-3}$ each include local volatile memory, which are coupled together by a grid manager 125. The servers $120_{1-3}$ are configured to store application data in memory, thereby improving latency by avoiding disk accesses. Further, the servers $120_{1-3}$ are configured to store application objects as serialized binary byte buffers and return on demand stored byte buffers, or data therefrom, to client applications $110_{1-3}$. For example, the servers $120_{1-3}$ may be WebSphere eXtreme Scale® network appliances or Web Sphere eXtreme Scale® containers/stand-alone servers.

Figure 2:
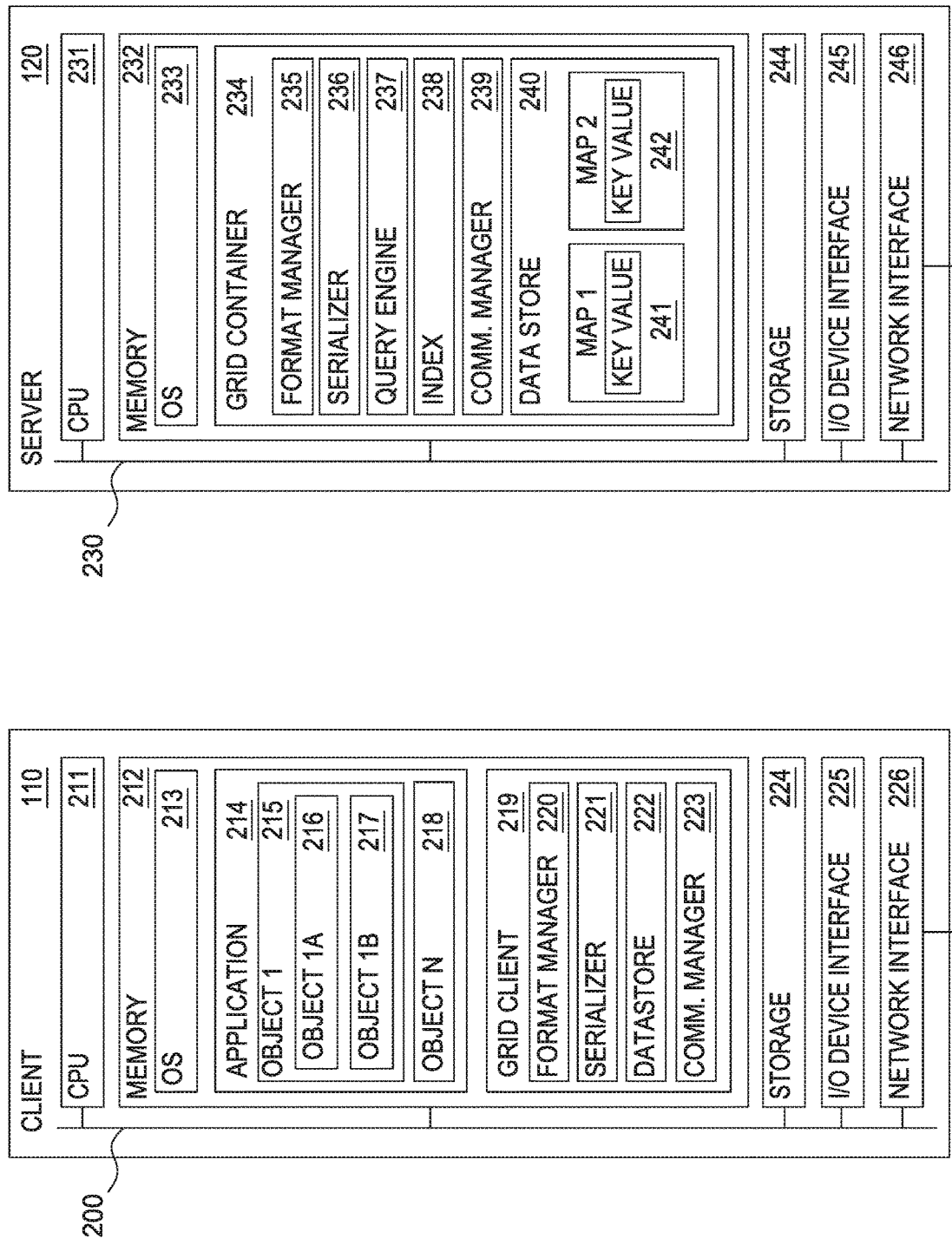
FIG. 2 is a more detailed illustration of the client and server systems of FIG. 1, according to one embodiment of the invention.

FIG. 2 is a more detailed illustration of the client and server systems of FIG. 1, according to one embodiment. As shown, the client system 110 includes, without limitation, an interconnect 200, a central processing unit (CPU) 211, a memory 212, storage 224, an I/O device interface 225 connecting I/O devices (e.g., keyboard, display and mouse devices) to the system 110, and a network interface 226.

The CPU 211 retrieves and executes programming instructions stored in the memory 212. Similarly, the CPU 211 stores and retrieves application data residing in the memory 212. The interconnect 200 facilitates transmission, such as of programming instructions and application data, between the CPU 211, I/O device interface 225, storage 224, network interface 226, and memory 212. The CPU 211 is included to be representative of a single CPU, multiple CPUs, a single CPU having multiple processing cores, and the like. And the memory 212 is generally included to be representative of a random access memory. The storage 224 may be a disk drive storage device. Although shown as a single unit, the storage 224 may be a combination of fixed and/or removable storage devices, such as fixed disc drives, flash memory devices, optical storage, network attached storage (NAS), or a storage area-network (SAN).

Further, client system 110 is included to be representative of a physical computing system as well as virtual machine instances hosted on a set of underlying physical computing systems. Further still, although shown as a single computing system, one of ordinary skill in the art will recognize that the components of the client system 110 shown in FIG. 2 may be distributed across multiple computing systems connected by a data communications network.

As shown, the memory 212 includes an operating system 213, an application 214, and a grid client 219. Illustratively, the application 214 includes object 1 215 and object N 218. Further, object 1 215 includes references (i.e., pointers) to object 1a 216 and object 1b 217. In this example, objects 215-218 are presumed to be object in the object-oriented programming sense. That is, each of the objects 215-218 may include one or more variables and methods as well as inherit methods and variables from other classes and implement interfaces of other classes.

The grid client 219 includes a format manager 220, a serializer 221, a datastore 222, and a communication manager 223. The format manager 220 keeps track of object format definitions for various objects stored in the datastore 222 and the datastore 240. In one embodiment, such format definitions may be retrieved from the server 120. Each object format definition may include a list of attributes and sub-attributes of the object, an order of the attributes and sub-attributes, attribute/sub-attribute data types (e.g., integer, string), and attribute/sub-attribute definitions. The attribute/sub-attribute definitions may include byte ranges for each attribute/sub-attribute indicating the bytes of binary byte buffers representations of the object which correspond to the attribute.

The serializer 221 serializes and inflates application objects based on the object format definition returned by the format manager 220 for the particular type of object. Alternatively, objects may be serialized/inflated by calling a dynamic serializer object which includes methods for performing those operations on the particular type of object. In one embodiment, the serializer 221 provides a middleware plugin which includes both a serialization configuration model (e.g., static or dynamic) and actual code (e.g., for a dynamic serializer class) which implements serialization.

The datastore 222 stores data as binary byte buffers, similar to the server-side data store 240, discussed in greater detail below. In general, data may be stored in one or more of the client-side datastore 222 and the server-side datastore 240. If data is stored in the server-side datastore 240, it is first sent from the client 110 to the server 120 via communication managers 223 and 239. In one embodiment, the client-side datastore 222 is a cache for the server-side datastore 240, where data is primarily stored.

As further shown in FIG. 2, the server system 120 includes, without limitation, an interconnect 230, a CPU 231, a memory 232, storage 241, an I/O device interface 242, and a network interface 243. In general, these components may have the same properties as the interconnect 200, the CPU 211, the memory 212, the storage 224, the I/O device interface 225, and the network interface 226, respectively, of the client system 110.

As shown, the memory 232 includes an operating system 233 and a grid container 234. Illustratively, the operating system 223 may be Linux®. The grid container 234 may be, for example, a Java® virtual machine. The grid container 234 includes a format manager 235, a serializer 236, a query engine 237, an index 238, a communications manager 239, and a datastore 240. Similar to the communication manager 223 of the client device 110, the communications manager 239 facilitates transmission and receival of binary byte buffers to and from the client 110. Further, the format manager 235 and the serializer 236 perform similar functions to the format manager 220 and the serializer 221, respectively, of the client system 110.

The query engine 237 and the index 238 use the format manager 235 and the serializer 236 to evaluate queries and create object attribute indexes, respectively. In one embodiment, the query engine 237 may parse the query into a compiled format for execution on underlying data source. In such a case, the query engine 237 may use the format manager 235 and the serializer 236 to help parse the part(s) of the query that access object attributes directly. The query engine may further return regular (as opposed to binary) objects or object attributes by converting bytes of the stored binary byte buffer(s) to regular form based on the object format definition(s) for those objects.

Similar to datastore 222, datastore 240 stores application objects as binary byte buffers. As shown, the datastore 240 includes data maps 241-242. As used herein, "data map" refers to a data structure for storing data. Illustratively, the data maps 241-242 store data as key-value pairs, where the keys are objects which identify values and the values are objects which include data.

Figure 3:
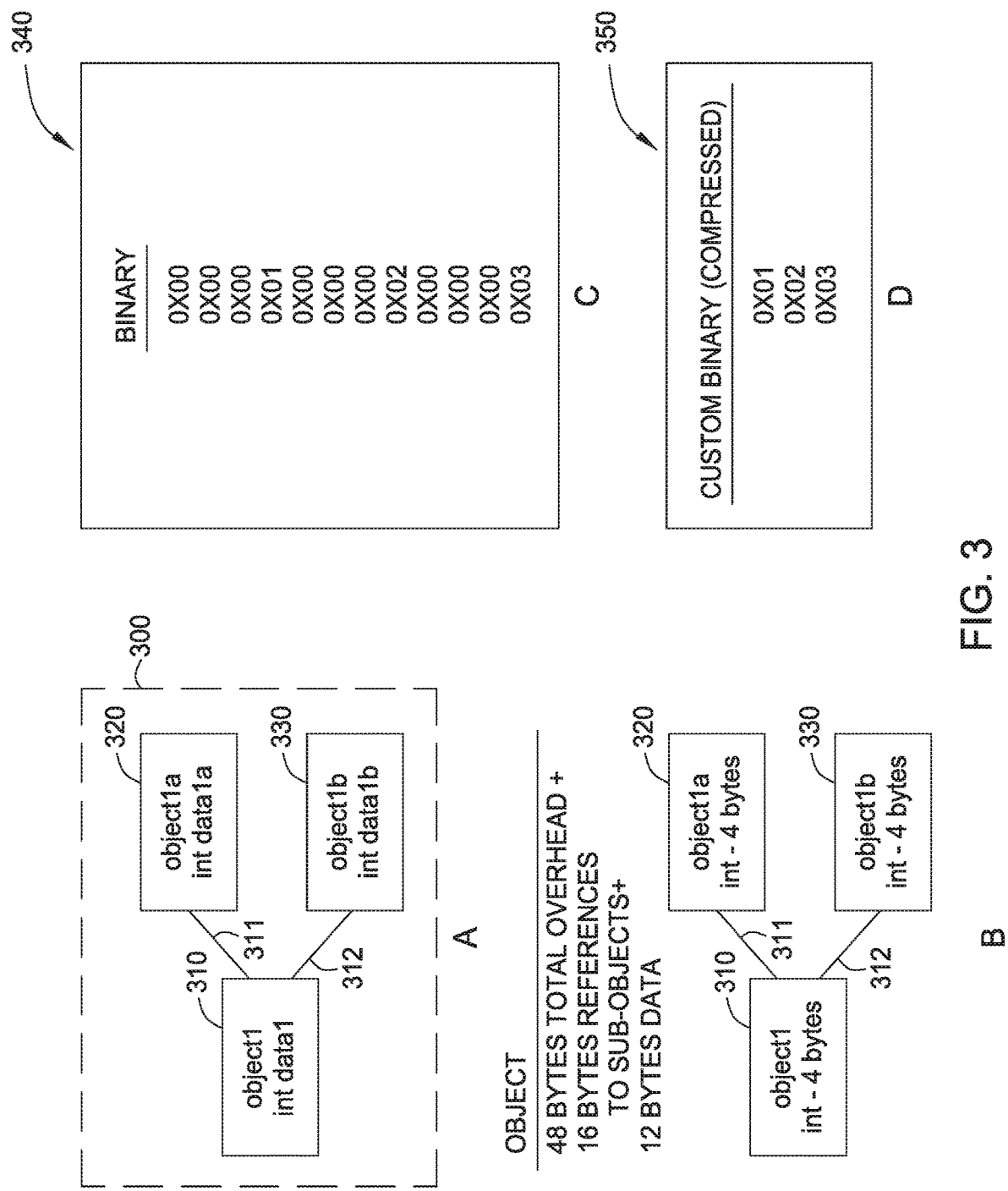
FIG. 3 illustrates an example java object serialized to a compressed binary format, according to one embodiment of the invention.

FIG. 3 illustrates an example java object serialized using a compressed binary format, according to one embodiment. As shown in panel A, object 300 includes an object named "object 1" 310 and sub-objects named "object 1a" 320 and "object 1b" 330. The object 310 includes an integer field named "data 1." Further, the object 310 includes references 311, 312 to the sub-objects 320 and 330, which are themselves objects with integer fields "data 1a" and "data 1b," respectively.

As shown in panel B, each of the integer fields of the object 310 and the sub-objects 320, 330 are four bytes in size, for a total of twelve bytes. Further, each of the references 311, 312 are eight bytes in size, for a total of sixteen bytes. Further still, each of the object 310 and the sub-objects 320, 330 include sixteen bytes of object overhead, for a total of forty-eight bytes. Object overhead may generally include pointers to the object's class, status flags, and the like.

As shown in panel C, the object 300 is serialized to a binary byte buffer 340 which is twelve bytes in size. For example, a serializer (not shown) may successively extract each of the values of integer fields data 1, data 1a, and data 1b from the object 310 and sub-objects 320, 330; convert the values to binary form; and append the values to the binary byte buffer. Illustratively, the values of integer fields data 1, data 1a, and data 1b are "1," "2," and "3," respectively. The serializer converts these values to big endian binary representations "0X00, 0X00, 0X00, 00X1"; "0X00, 0X00, 0X00, 0X02"; and "0X00, 0X00, 0X00, 0X03," respectively. The serializer then successively appends the binary bytes to a byte buffer, resulting in the following sequence of bytes: "0X00, 0X00, 0X00, 00X1, 0X00, 0X00, 0X00, 0X02, 0X00, 0X00, 0X00, 0X03." Note, the serializer does not append binary representations of the forty-eight bytes of object overhead or the sixteen bytes of reference data to the binary byte buffer 340. As a result, the binary byte buffer 340 may require less storage space than the regular object 300.

Panel D shows the object 300 serialized to a custom, compressed binary form. For example, a serializer (not shown) may extract each of the values of integer fields data 1, data 1a, and data 1b from the object 310 and sub-objects 320, 330; convert the values to the custom binary form; and append the values to the binary byte buffer 350. Similar to the discussion above, the serializer generates the binary bytes "0X01, 0X02, 0X03" by determining the custom binary representation of the values of each of the integer fields data 1, data 1a, and data 1b, and successively appending these bytes to a binary byte buffer.

Figure 4:
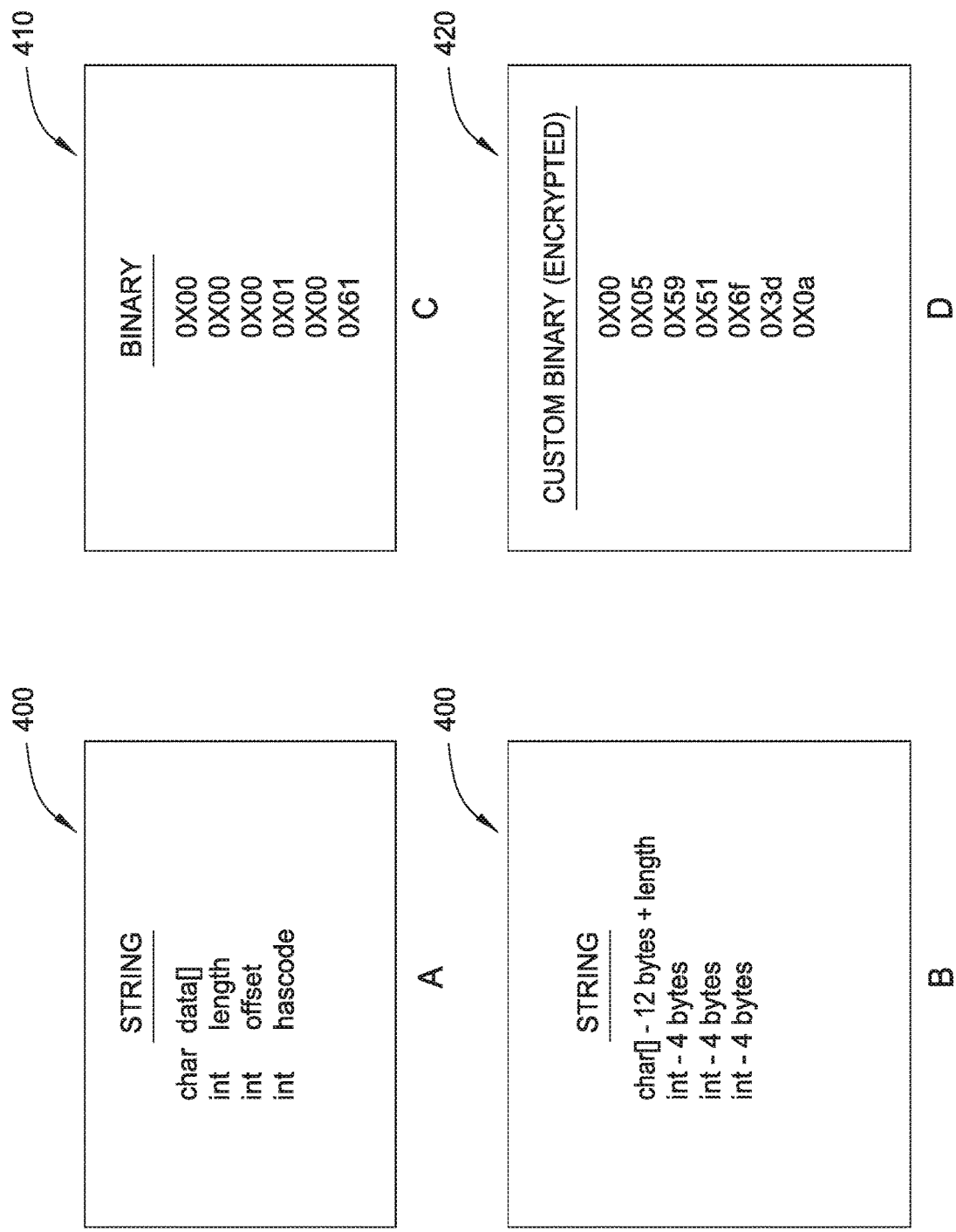
FIG. 4 illustrates an example java object serialized to an encrypted binary format, according to one embodiment of the invention.

FIG. 4 illustrates an object 400 serialized using an encrypted binary format, according to one embodiment. As shown in panel A, the object 400 is a string object which includes a character array "data[ ]", an integer "length," an integer "offset," and an integer "hashcode." As shown in panel B, each of the integers is four bytes. Further, the character array is illustratively twelve bytes plus four bytes for an integer length of the character array.

Panel C shows a binary byte buffer 410 created based on the characters of the character array of the object 400. Similar to Panel C of FIG. 3, a serializer (not shown) extracts each of the values of the character array from the object 400, converts the values to binary form, and adds the binary representations of the values to the binary byte buffer 410. Note, the serializer does not add binary representations of the integer length of the character array or the integer "length," the integer "offset," or the integer "hashcode" of the object 400.

Panel D shows the object 300 serialized to a custom, encrypted binary form. Similar to panel D of FIG. 3, a serializer (not shown) may extract each of the values of the character array from the object 400, convert the values to encrypted binary form, and append the encrypted binary bytes to the binary byte buffer 420.

Figure 5:
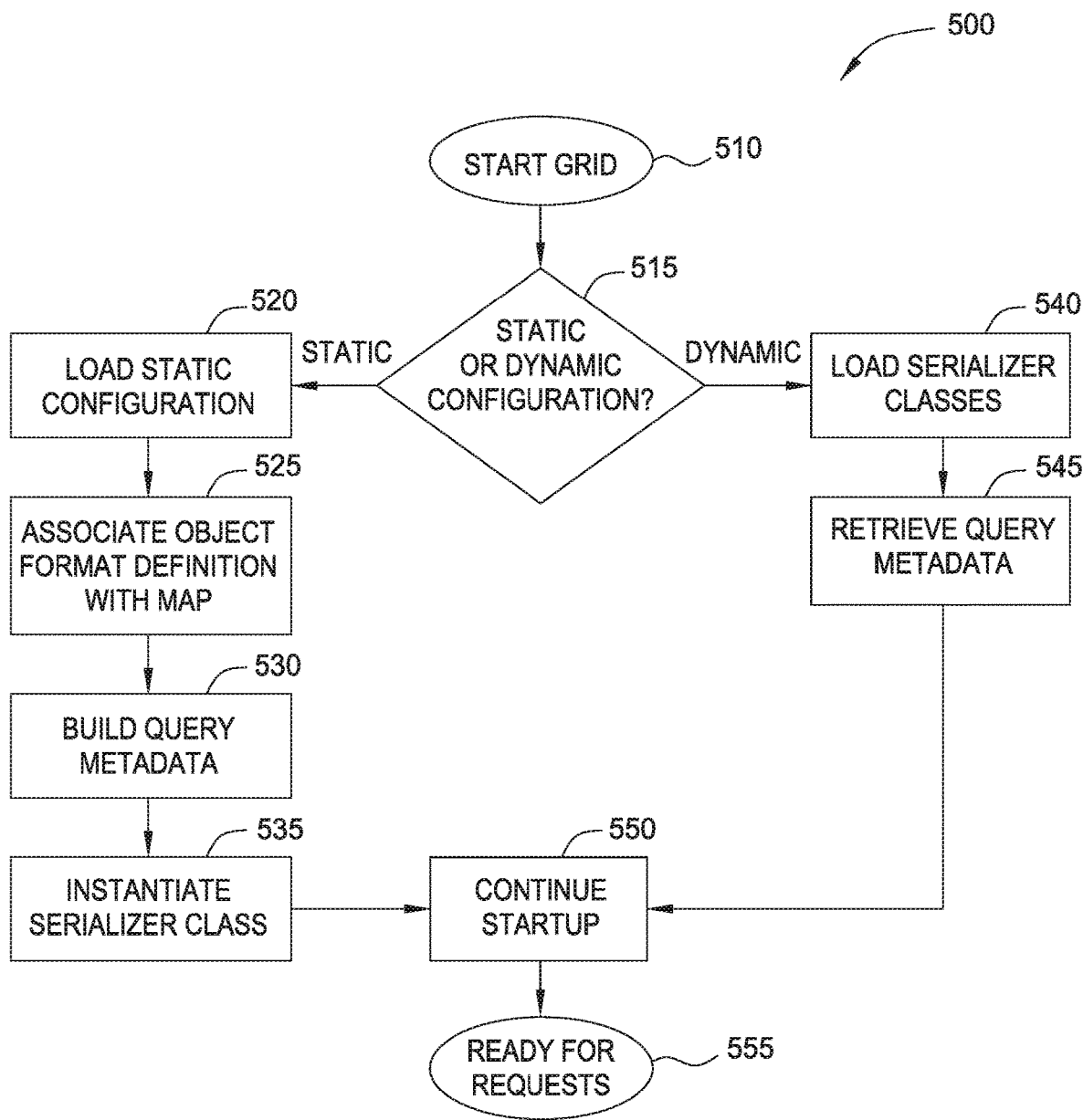
FIG. 5 illustrates a method for initializing a data grid, according to one embodiment of the invention.

FIG. 5 illustrates a method 500 for initializing a data grid, according to one embodiment of the invention. As shown, the data grid is started at step 510. At step, 515, a server-side format manager determines whether configuration information indicates a custom in-memory object format(s) is static or dynamic. As used herein, "static" configuration information includes external metadata in configuration files (e.g., XML files) which describe the custom in-memory (i.e., binary) format(s) of one or more object types. For example, the configuration files may describe object attribute data types (e.g., integer), sizes (e.g., bytes), byte orders (e.g., big endian), compression and/or encryption formats, and the like. In an alternative embodiment, annotations, discussed in greater detail below, may be used in lieu of, or in conjunction with, configuration files. As used herein, "dynamic" configurations include objects having methods which perform various operations (e.g., inflating and deflating objects). For example, the developer of the client application may write one or more classes to perform custom serialization of objects. In some embodiments, such classes may be used in lieu of, or in conjunction with, static configuration files/annotations to initiate the data grid.

If the format manager determines that the configuration information is static at step 515, the method 500 continues at step 520, where the format manager loads object configuration information based on the descriptions in the static files and/or annotations. For example, the format manager may build an "object format" definition, which includes information relating to object attributes (e.g., data type, sizes, byte order, etc.), for each type of object and store the object format descriptions. Table 1 shows illustrative object format definitions corresponding to the example objects discussed above with respect to FIGS. 3-4.

TABLE 1

Object Formats for Map1

| Object | Attribute | Byte Range | Data Type |
|---|---|---|---|
| Object 1 | data1 | 0-3 | Integer |
|  | sub-object1a | 4-7 | Object:Object1a |
|  | sub-object1b | 8-11 | Object:Object1b |
| Object1a | data1a | 0-4 | Integer |
| Object1b | data1 | 0-4 | Integer |
| String | length | 0-3 | Integer |
|  | offset | 4-7 | Integer |
|  | hashcode | 8-11 | Integer |
|  | data | 12-var | char[ ] |

Note, the files and/or annotations, and the object format definitions generated therefrom, may indicate that certain data attributes (e.g., character arrays in string objects) have variable length. Alternatively, the format manager may automatically encode the length of data attributes having variable lengths.

At step 525, the format manager associates each object format definition with a data map of the data grid. As discussed above, the object format definitions associated with the data maps may indicate the data type, size, etc. of object attributes that are stored as binary values in the respective data maps. In one embodiment, the same configuration information may be associated with more than one data map.

At step 530, a grid container of the data grid builds query metadata using the object format definitions loaded and associated at steps 520 and 525, respectively. In one embodiment, the grid container may generate a query catalog which includes object attributes which may be used, for example, to evaluate queries or to create indexes for particular stored attributes. An example query catalog is shown in Table 2.

TABLE 2

Query Catalog for Map1

| Map | Value Name | Data Type |
|---|---|---|
| Map1 | data | Integer |
| Map1 | sub-object1.data1a | Integer |
| Map1 | sub-object1b.data1b | Integer |

The query engine may use metadata of the query catalog and configuration information of object format definitions to evaluate a query. For example, if the query engine receives the query "SELECT o FROM Map1 o WHERE o.sub-object1a.data1a=2," the query engine may use the query catalog metadata of Table 2 and the configuration information of Table 1 to determine that sub-object1a.data1a corresponds to bytes 4-7 of binary representations of sub-object 1 objects. The query engine may then compare bytes 4-7 of each stored sub-object1 object to the value of "2" and to return sub-object1 objects for which bytes 4-7 equal 2.

At step 535, a new serializer implementation is instantiated (e.g., by registering the serializer class). The serializer is configured to use stored object format definitions to deflate (i.e., serialize) objects, inflate objects, compare binary byte buffers for identity, and the like. That is, the serializer is configured to perform steps to deflate objects to binary byte buffers, inflate objects from binary byte buffers, determine whether objects deflated to binary byte buffers are identical by comparing the byte buffers, etc. according to the object format definitions.

Alternatively, if the format manager determines at step 515 that the configuration information is dynamic, then at step 540, the serializer instantiates dynamic objects which include methods for serializing objects, inflating objects, comparing identity, and the like. As discussed above, the developer of the application may, for example, write code which performs serialization, etc. for the objects of the application. In such cases, the dynamic objects may provide support for one or more of the features described above with respect to steps 520, 530, and 535.

At step 545, the grid container interrogates the object(s) instantiated at step 540 to retrieve query metadata. Each dynamic object class instance may be configured to return information relating to indexable and queryable attributes of the class. Similar to the discussion above, information retrieved from the object(s) may be converted to query metadata of a query catalog.

At step 550, any other needed data grid start-up operations are performed. At 555, the data grid is ready for requests (e.g., a query request).

Although described above with respect to server-side operations, the grid client may perform steps similar to steps 515, 520, 525, 535, and 540 to initialize the client-side format manager and serializer. After such initialization is performed, the grid client may use the serializer and format manager to serialize application objects according to associated object format definitions and send the binary objects via the communications manager to the data grid for storage.

Figure 5A:
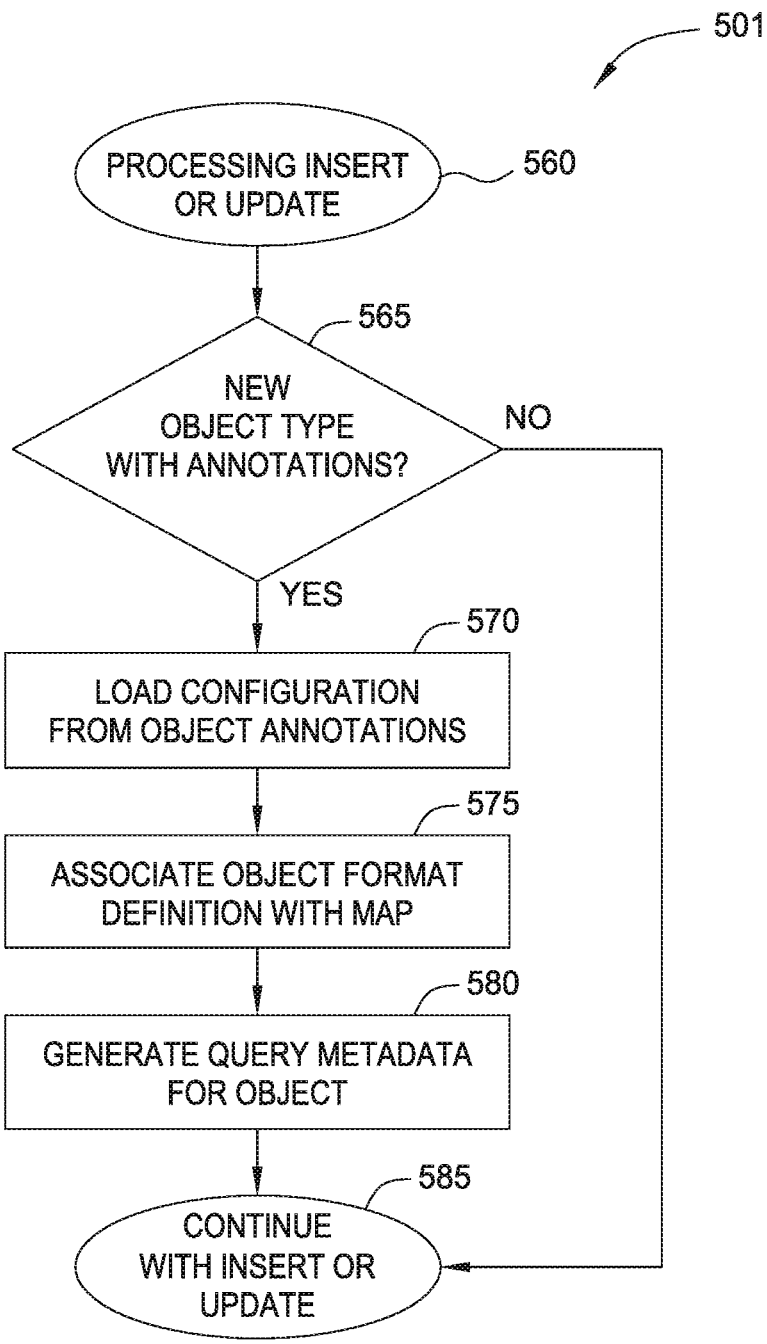
FIG. 5A illustrates a method for updating a format manager, according to one embodiment of the invention.

FIG. 5A illustrates a method 501 for updating object format definitions and query catalogs of a data grid, according to one embodiment. As shown at 560, the method 501 begins during processing of an insert or update of an object to/in the data grid. At step 565, a format manager determines whether the object is of a type recognized by the format manager, and if it is not, whether the object type includes configuration annotations. In one embodiment, configuration annotations include metadata describing custom in-grid data formats of objects. For example, the metadata may describe attribute data types (e.g., integer), sizes (e.g., bytes), byte orders (e.g., big endian), compression and/or encryption formats, and the like. In an alternative embodiment, files (e.g., XML files) may be used in conjunction with, or lieu of, configuration annotations to describe the object type. In yet another embodiment, executable code (e.g., dynamic objects) which loads configuration information may be used in lieu of configuration annotations and XML, files.

If the format manager determines that the object is not of a new type (step 565) or that the object is of a new type but does not include configuration annotations, then a grid container (or a grid client, if data is being inserted into a client-side data store) continues with the insert or update operation at step 585. Alternatively, at step 570, the format manager loads configuration information based on the annotations. For example, the format manager may generate an "object format" definition, similar to that shown in Table 1, based on the annotations. Note, the configuration annotations and the object format definitions generated therefrom, may indicate that certain data attributes have variable length (e.g., character arrays in string objects). Alternatively, the format manager may automatically encode the length of data attributes having variable lengths.

In one embodiment, the grid container may automatically generate format definitions for new object types even when no configuration annotations are available. In such a case, the grid container may inspect the object being inserted or updated (e.g., using Java® reflection) to determine the attributes, data types, etc. of the object. The grid container may then generate the format definitions based on those attributes, data types, etc. For example, the grid container may determine that the attributes of the object relate to personal information and generate a format definition which indicates that the attributes are to be converted to an encrypted binary format for storage in the data grid.

At step 575, the format manager associates the object format definition with a data map of the data grid. Similar to step 525 of FIG. 5, the object format definition associated with the data map may indicate the data type, size, etc. of object attributes stored in values of the data map. In one embodiment, the same object format definition may be associated with more than one data map.

At step 580, a grid container generates query metadata for the object, similar to step 530 of FIG. 5. In one embodiment, the grid container may add the metadata to a query catalog used to execute queries, create indexes for particular stored attributes, and the like.

The method 501 ends thereafter at 585, where the insert or update operation continues. Note, the serializer instantiated at step 535 of FIG. 5 may remain unchanged. For example, the serializer may be configured to always use the most current object format definitions to inflate objects, deflate objects, etc.

Although described above primarily with respect to server-side operations, the grid client may perform steps similar to steps 565, 570, and 575 to update the client-side format manager and serializer. After such initialization is performed, the grid client may use the serializer and format manager to serialize application objects according to associated object format definitions and send the binary objects via the communications manager to the data grid for storage.

Although described above as using static custom in-memory object format(s), in an alternative embodiment, a dynamic object may be used instead to update object format definitions and query catalogs of a data grid, similar to step 545 of FIG. 5.

Figure 6:
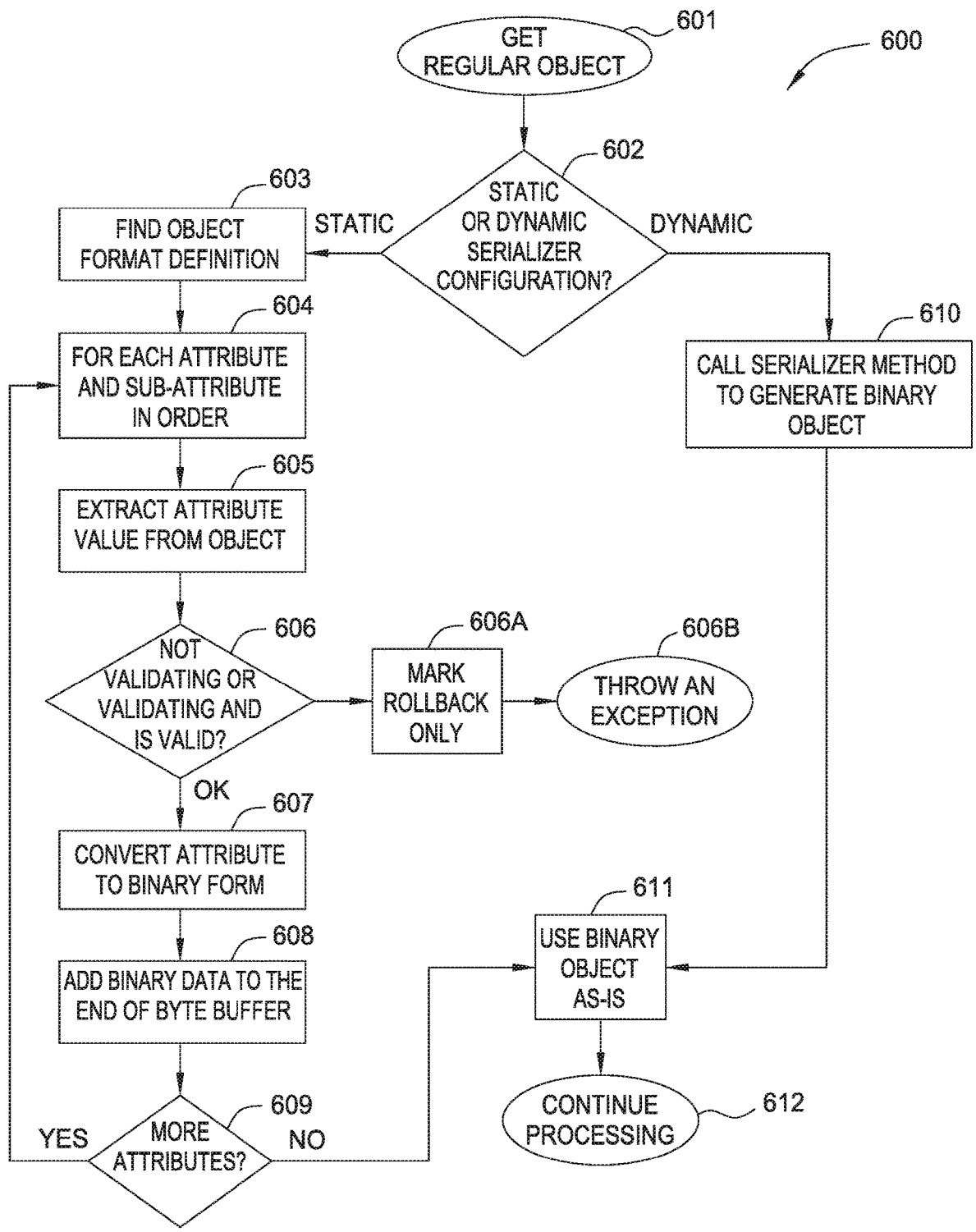
FIG. 6 illustrates a method for serializing an object using a custom binary format, according to one embodiment of the invention.

FIG. 6 illustrates a method 600 for serializing objects to byte buffers having a custom binary representation, according to one embodiment. During a data grid transaction, for example, the method 600 may be used to generate the value which is committed to the (server- or client-side) data store.

As shown, the method 600 begins at 601, where the serializer receives an object for serialization. At step 602, the serializer determines whether a serialization configuration for the object is static or dynamic. If the configuration is static, the method 600 continues at step 603, where the serializer identifies, based on stored object format information, an object format definition corresponding to the binary byte buffer. In one embodiment, each data map in the data grid stores one type of object. In such a case, the serializer may simply identify an object format associated with the data map in which the binary byte buffer is stored.

At step 604, the serializer enters a loop to process particular attributes (and sub-attributes, if any) of the object in the order indicated by the object format definition identified at step 603. At step 605, the serializer extracts a value of an attribute indicated in the object format definition. For example, the serializer may access a field directly (e.g., "Object.field") to extract the field.

At step 606, the serializer either validates the attribute value extracted at step 605 or skips directly to step 607. If the serializer is configured to validate the attribute value, it may do so based on information about the attribute in the object format definition. For example, the object format definition may indicate that a particular attribute is a 4 byte integer. In such a case, the serializer may validate the extracted attribute value by determining whether it is in fact a 4 byte integer. If validation fails, the data may, for example, be corrupt. When validation fails, the serializer marks the transaction as rollback only at step 606*a*, thereby setting a flag indicating that the transaction cannot be committed. Further, the serializer throws an exception at step 606*b*.

If the serializer successfully validates the attribute value, or if no validation is performed, the method 600 continues at step 607, where the attribute is converted to binary form according to the object format definition. As discussed above, the object format definition may indicate byte order (e.g., big endian), encryption and compression formats, and the like for the binary form of the attribute. At step 607, the serializer converts the attribute value to binary form based on this information.

At step 608, the converted binary data is appended to (e.g., the end of) a byte buffer for the object. At step 609, the serializer determines, based on the object format definition, whether additional object attributes need to be extracted and processed according to steps 605-608. By thus iterating through one or more object attributes, the serializer serializes the object to the binary byte buffer based on the object format definition.

If the serializer determines that the serializer configuration is dynamic, the serializer calls a "serialize" method of a dynamic object to serialize the object. The serialize method may perform one or more of the steps 604-609 for serializing the object. Alternatively, the serialize method may serialize the object via a different approach.

After steps 609 and 610, the method 600 continues at step 611, where the grid container or the grid client use the binary byte buffer created by the serializer (e.g., by storing it in a data map or evaluating queries using the binary byte buffer). Other processing is then performed at step 612.

Figure 6A:
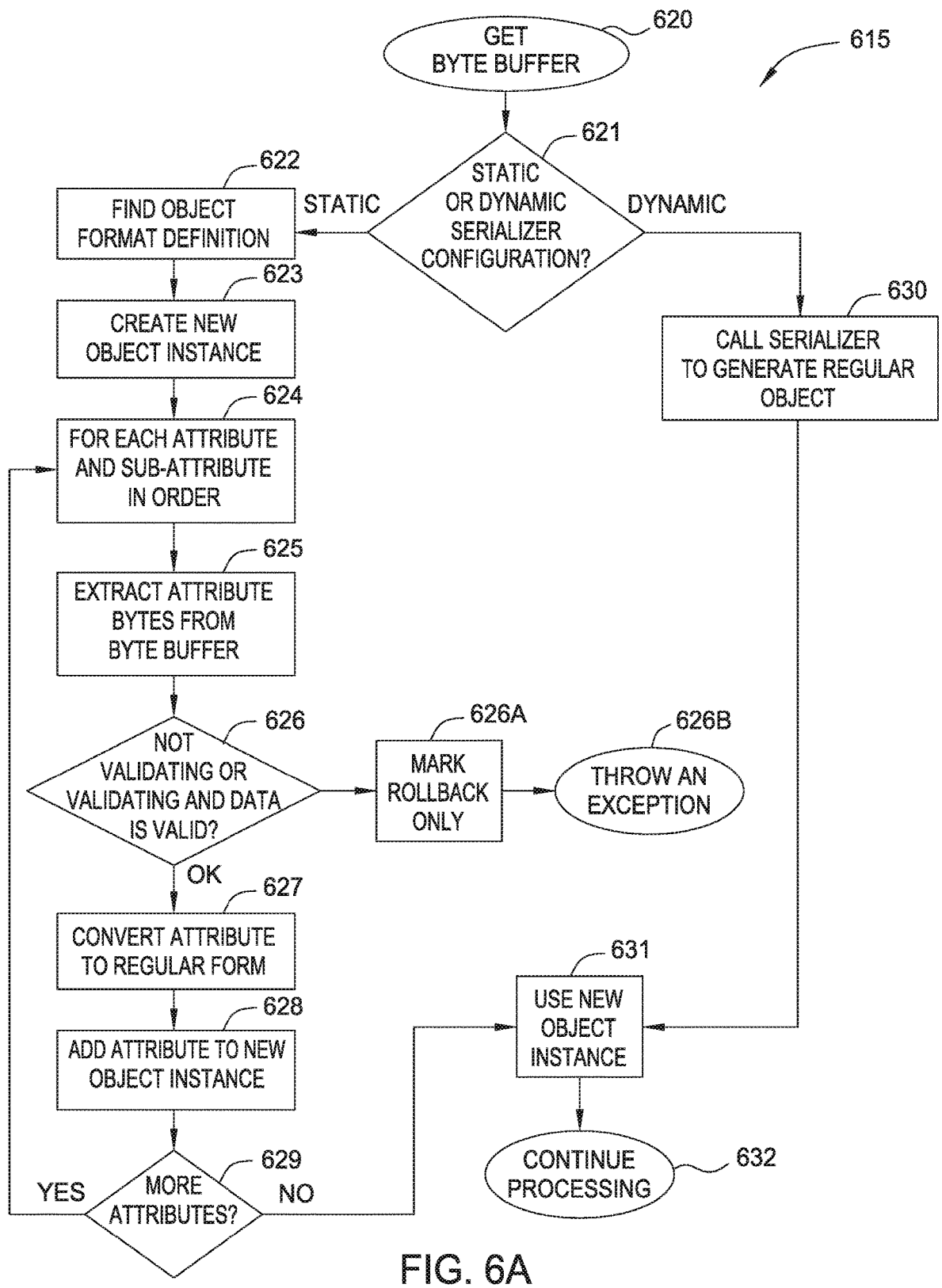
FIG. 6a illustrates a method for inflating a binary object using a custom binary format, according to one embodiment of the invention.

FIG. 6*a* illustrates a method for inflating an object from a byte buffer having a custom binary representation, according to one embodiment. As shown, the method 615 begins at 620, where the serializer receives a binary byte buffer representation of an object. At step 621, the serializer determines whether a serialization configuration for the object is static or dynamic. If the configuration is static, the method 615 continues at step 622, where the serializer identifies, based on stored object formats, an object format definition corresponding to the binary byte buffer. In one embodiment, each data map in the data grid stores one type of object. In such a case, the serializer may simply identify an object format associated with the data map in which the binary byte buffer is stored.

At step 623, the serializer creates a new object instance according to the object format definition identified at step 622. For example, if the object format definition indicates that the object is a String, the serializer may create a new String object instance. At step 624, the serializer enters a loop to process each attribute (and sub-attribute, if any) of the binary byte buffer in the order indicated by the object format definition identified at step 621. Steps 624-628 in the loop are roughly the inverse of steps 605-608 of FIG. 6.

At step 625, the serializer extracts bytes from the binary byte buffer that correspond to an object attribute according to the object format definition. For example, if the object format definition indicates that bytes 0-3 of the binary byte buffer correspond to a first attribute of the object, then the serializer may extract those bytes from the binary byte buffer.

At step 626, the serializer either validates the attribute bytes extracted at step 625 or skips directly to step 627. Similar to step 606 of FIG. 6, the serializer may determine based on the object format definition whether the attribute bytes are valid. For example, the object format definition may indicate that a particular attribute is an integer less than some predefined value. In such a case, the serializer may validate the extracted attribute bytes by determining whether the bytes represent an integer less than the predefined value. If validation fails, the data may, for example, be corrupt. When validation fails, the serializer marks the transaction as rollback only at step 626a, thereby setting a flag indicating that the transaction cannot be committed. Further, the serializer may throw an exception (step 626b).

If the serializer validates the attribute bytes (or if no validation is performed) then the binary attribute is converted to regular form according to the object format definition (step 607). As discussed above, the object format definition may indicate byte order (e.g., big endian), encryption and compression formats, and the like for serializing the attribute. The serializer converts the binary attribute back to regular form by performing operations which are inverse to those which would be performed during serialization. For example, the serializer may perform un-encryption and de-compression of the attribute bytes based on encryption and compression formats indicated in the object format definition.

At step 628, the converted attribute is added to the new object instance. For example, the serializer may access a field directly (e.g., "Object.field") and set the field value equal to the value of the converted attribute. At step 629, the serializer determines, based on the object format definition, whether additional attributes need to be extracted and processed according to steps 625-628. By thus iterating through one or more attributes, the serializer inflates the binary byte buffer to a regular object based on the object format definition.

If the serializer determines at step 621 that the serializer configuration is dynamic, the serializer calls a "de-serialize" method of a dynamic serializer object to inflate the object. The de-serialize method may perform one or more of the steps 623-629 to inflate the object. Alternatively, the serialize method may inflate the object via a different approach.

After steps 629 and 630, the method 601 continues at step 631, where the data grid uses inflated object. For example, the data grid may transmit the inflated object over a network to a client application. Other processing is then performed at step 632.

Although described above with respect to inflating objects, similar steps may be used to perform certain queries and indexing. For example, a user may wish to query a list of bank transactions by account number. When transaction information is stored in the data grid in a custom format, the format manager may store a type and definition for both an account number attribute and a transaction number attribute. As discussed above, the definition may include a byte range for each attribute. A query engine may then check the bytes of stored byte buffers which are in the byte range for the account number attribute and compare those bytes with the user-specified value. For entries having account numbers matching the user-specified value, the query engine may further extract the bytes in the byte range for the transaction number attribute, validate the extracted bytes, and convert the extracted bytes to regular form, similar to steps 625-627. The query engine may then return the regular form value(s).

Likewise, indexing may be performed after extracting values of an attribute based on an object format definition and validated the extracted values, similar to steps 625-626. In particular, the attribute values may be extracted in binary form and inserted in that form into the index.

In addition to the query engine and the index, MapReduce code may be pushed to a server of the data grid so that processing may be performed in parallel. Such code may, for example, get the balance of an account entry in the data grid. Further, such code may directly use object format definitions to, for example, extract only those bytes of binary byte buffers which correspond to the account balance attribute. In other cases, the MapReduce code may make use of the query engine, the index, or the serializer discussed above.

Figure 7:
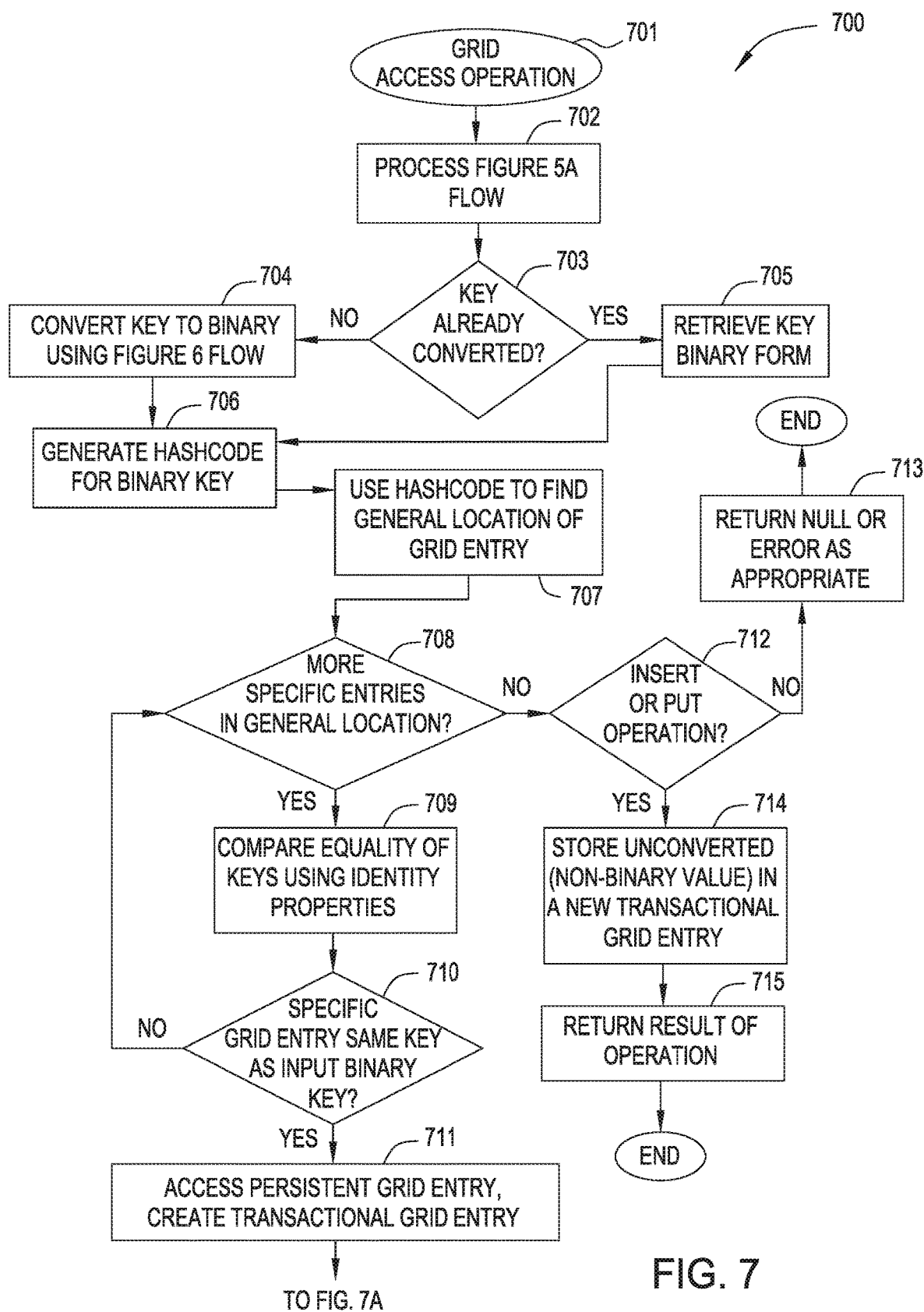
FIG. 7 illustrates a method for performing a grid access operation, according to one embodiment of the invention.

FIG. 7 illustrates a method 700 for performing a grid access operation, according to one embodiment. As shown, the method 700 begins when a grid access operation is received at 701. The grid access operation may include one of inserting a value object into the grid or updating, removing, or getting a value object from the data grid. Further, the grid access operation may identify a key for use in locating the value object in the data grid. As discussed above, each of the data maps in the data grid stores data as key-value pairs. For example, a "person" object may be stored as a value in the data map, and another object which includes the person's name and social security number may be used as a key. Further, both the person object and the key object may be stored as binary byte buffers, as opposed to inflated objects.

At step 702, a format manager and a grid container perform the steps of method 501 to update object format definitions and query catalogs if the grid access operation is an insert or update operation. At step 703, the grid container determines whether the key identified in the grid access operation already exists in binary form (e.g., if the key was previously converted to binary form in a multi-step transaction). If the key does not exist in binary form, the method 700 continues at step 704, where the grid container invokes the method 600 to convert the key to binary form (i.e., to serialize the key). Alternatively, if the key already exists in binary form, then, at step 705, the grid container simply retrieves the binary key for later use.

At step 706, the grid container generates a hash code for the binary key. In one embodiment, the class of the key object may implement a known hashing technique (e.g., MD5) which generates the hash code. In such a case, the grid container may simply call this hash method to get a hash code. In an alternative embodiment, the serializer configuration may be dynamic, and the grid container may instead call a "hash" method of a dynamic object instance to generate the hash code based on the binary key. As discussed above, a developer (e.g., the application developer) may write a class which includes methods for performing various operations such as serialization, hashing, comparing identity, and the like.

At step 707, the grid container uses the hash code to find a general location of the grid entry. For example, data maps of the data grid may be subdivided using buckets, and keys associated with each bucket may hash to a unique range of values. In such a case, the general location of the data grid may correspond to a bucket of the data map, and finding the general location may include determining that the hash code is within the range of values associated with the bucket.

At step 708, the grid container determines whether more specific entries exist at the general location (e.g., whether any data grid entries exist for a data map bucket). If no specific entries exist at the general location, the method 700 continues at step 712, where the grid container determines whether the grid access operation is an insert or put operation. If the grid access operation is an insert or put operation, the method 700 continues at step 714, where the grid container stores the value object in a new transactional grid entry. The grid container may further commit the transactional grid entry according to method 800 of FIG. 8, discussed below. At step 715, the grid container returns the result of the operation (e.g., that the operation was successful). Alternatively, if the grid access operation is determined at step 712 to not be an insert or put operation, the method 700 continues at step 713, where the grid container returns null or error, as appropriate.

If more specific entries exist at the general location, the method continues at step 709, where the grid container compares the equality of a binary key with a key at the general location using identity properties. For example, the binary key may simply be compared byte-for-byte with the key at the general location. In an alternative embodiment, the binary key may be hashed, and the grid container may determine whether the hash value corresponds to any key at the general location. In yet another embodiment, the grid container may compare one or more attribute values of the key object which are unique (e.g., the social security number of a person object). In such a case, the grid container may use the object format definition to determine byte(s) of the binary key and the key at the general location which correspond to the one or more attributes. The grid container may then compare those bytes (or, e.g., a hash of those bytes) for equality.

At step 710, the grid container determines, based on the comparison of step 709, whether the grid entry key is the same key as the input key. If the keys are not the same, the method 700 returns to step 708, where the grid container determines whether additional entries exist at the general location and then compares those additional entries at step 712. If the grid entry has the same key as the input key, the method 700 continues at step 711, where the grid container accesses the grid entry and creates a transactional grid entry.

Figure 7A:
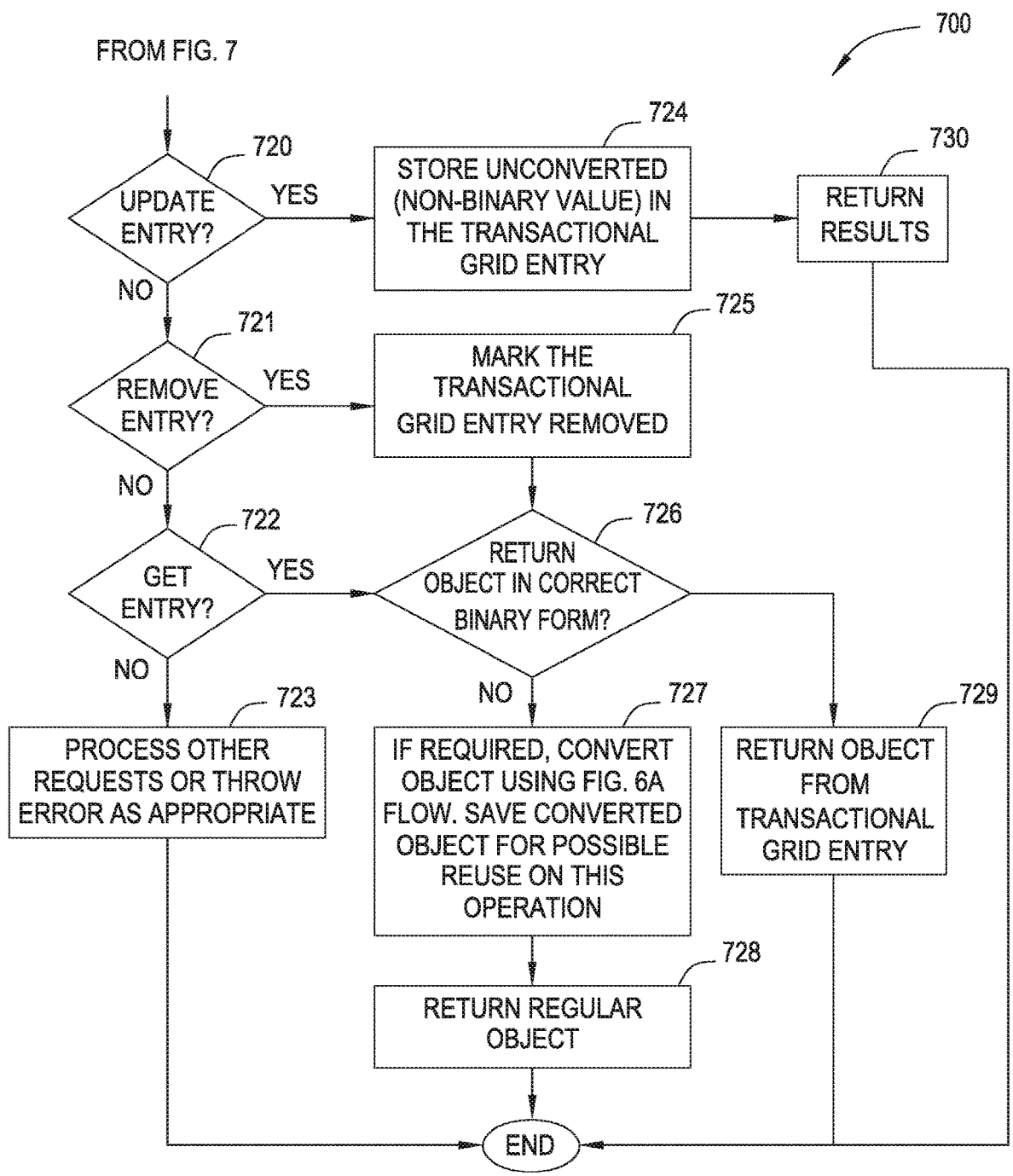
FIG. 7a illustrates a continuation of the method for performing a grid access operation of FIG. 7, according to one embodiment of the invention.

FIG. 7a illustrates a continuation of the method 700 for performing a grid access operation, according to one embodiment. From step 711, the method continues to step 720, where the grid container determines whether the grid access operation is an update operation. If the grid access operation is an update operation, the method 700 continues at step 724, where the grid container stores the unconverted value object in the transactional grid entry created at step 711. The grid container may further commit the transactional grid entry according to method 800 of FIG. 8, discussed below.

If at step 720, the grid container determines that the grid access operation is not an update operation, the method 700 continues at step 721, where the grid container determines whether the grid access operation is a remove operation. If the grid access operation is a remove operation, the method 700 continues at step 725, where the grid container marks the transactional entry as removed.

If at step 721, the grid container determines that the grid access operation is not an update operation, the method 700 continues at step 722, where the grid container determines whether the grid access operation is a get operation. If the grid access operation is a get operation, the method 700 continues at step 726, where the grid container determines whether to return the value object in binary or regular form. For example, the grid access operation may indicate whether the value object is returned in regular or binary form. If the grid container determines that the value object is to be returned in binary form, the grid container simply returns the object retrieved at step 711.

If the grid container determines that the value object is to be returned in regular form, the method 700 continues at step 727, where, if required, the steps of method 601 are performed to convert the binary value object to regular form. Further, the grid container may cause the converted binary object to be saved for possible re-use. Then, at step 728, the grid container returns the regular object.

If at step 722 the grid container determines that the operation is not a get operation, the method 700 continues at step 723, where the grid container processes other requests or throws an error, as appropriate.

Although described above with respect to operations performed by the grid container, the grid client may perform steps similar to one or more steps of method 700 in cases where the grid access request deals with data stored in a client-side data store.

Figure 8:
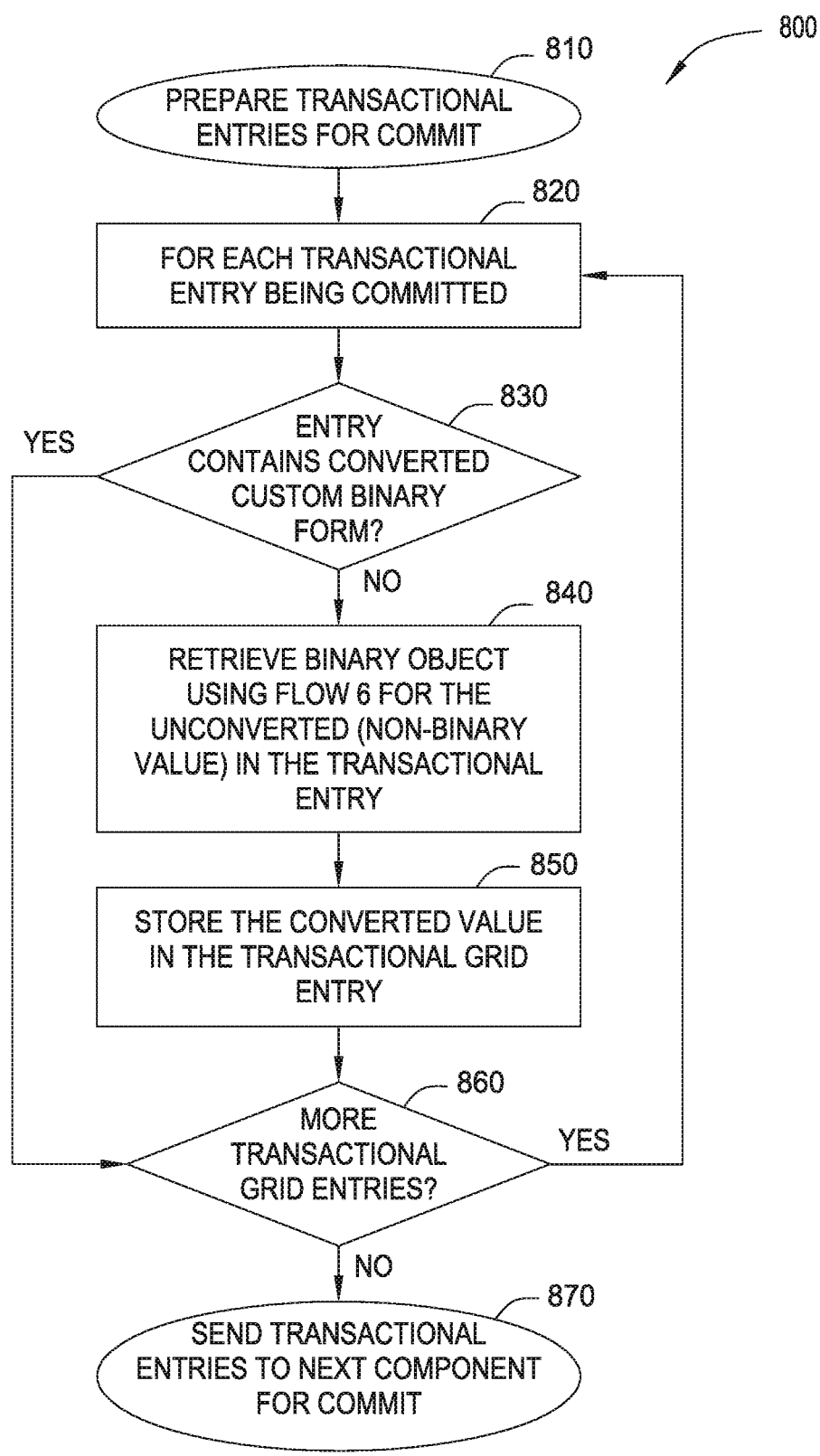
FIG. 8 illustrates a method for converting transactional data grid entries to custom binary form, according to one embodiment of the invention.

FIG. 8 illustrates a method 800 for converting transactional data grid entries to custom binary form for commit, according to one embodiment. As shown, the method 800 begins during preparation of the transactional data grid entry for commit at 810. At step 820, the method 800 loops through each transactional grid entry being committed. At step 830, a committing component determines whether the entry contains a byte buffer in custom binary form. If the entry contains the byte buffer in custom binary form, the method 800 proceeds to step 860, where the committing component determines whether there are more entries to commit.

If the committing component determines at step 830 that the entry does not contain data in custom binary form, the method 800 continues at step 840, where the data grid serializes the value object of the transactional grid entry according to method 600 of FIG. 6. At step 850, the committing component stores the converted value (i.e., the binary byte buffer) in the transactional grid entry for commit.

At step 860, the committing component determines whether there are additional transactional grid entries to process. If there are additional transactional grid entries to process, the method 800 returns to step 830. If there are no more transactional grid entries to process, the method ends at 870, where the committing component sends the transactional entries to another component in the system (e.g., the data store or the communication manager) which actually commits the entries.

Advantageously, custom in-memory formats (e.g., compressed or encrypted formats) are supported by the methods discussed herein. Such custom formats may be more desirable and/or more efficient than a mandated format. For example, objects stored using a custom compressed format may require less storage space than the mandated format.

While the foregoing is directed to embodiments of the present invention, other and further embodiments of the invention may be devised without departing from the basic scope thereof, and the scope thereof is determined by the claims that follow.

What is claimed is:

1. A computer-implemented method for implementing custom object-in-memory formats in a data grid network appliance, comprising:
    maintaining a record of format definitions, wherein each of the format definitions specifies a format for serializing objects of a respective class of object-oriented programming objects to byte buffers and deserializing the byte buffers and indicates one or more attributes of objects of the class and data types and byte ranges of the attributes;

in response to identifying that an object being inserted into or updated in a data grid is of a new type not associated with any format definition in the record of format definitions:
  generating a new format definition for the new type of object based on at least one of configuration annotations or files specifying an associated serialization format and an inspection of the new type of object using reflection, and
  inserting the new format definition into the record of format definitions;
and performing a data grid operation using one or more format definitions retrieved from the record of format definitions.

2. The method of claim 1, wherein performing the data grid operation includes serializing at least one object, the serializing comprising:
for each of the at least one object:
  extracting values of attributes from the object in an order specified in one of the format definitions retrieved from the record of format definitions and associated with the object,
  converting the extracted values to binary bytes, and appending the binary bytes to a byte buffer.

3. The method of claim 2, wherein the extracted values are converted to the binary bytes in either a compressed or an encrypted form specified by the one of the format definitions.

4. The method of claim 2, wherein the serializing further includes, for each of the at least one object, validating the extracted values based on the one of the format definitions.

5. The method of claim 2, wherein the at least one object is stored in byte buffer form in the data grid.

6. The method of claim 1, further comprising,
inserting, into the record of format definitions, dynamic configuration information associated with instantiated dynamic objects which each include one or more serializer methods called to perform serialization and deserialization of a respective class of objects; and
serializing at least one object by calling the serializer method of one of the dynamic objects associated with the at least one object.

7. The method of claim 1, wherein performing the data grid operation includes deserializing at least one byte buffer stored in the data grid, the deserializing comprising:
for each of the at least one byte buffer:
  creating a new object instance based on one of the format definitions retrieved from the record of format definitions and associated with the byte buffer,
  extracting bytes from the byte buffer corresponding to object attributes based on the one of the format definitions,
  converting the extracted bytes to regular attribute form based on the one of the format definitions, and
  adding the converted attributes to the new object instance.

8. The method of claim 7, wherein converting the extracted bytes to regular attribute form includes decompressing or decrypting the extracted bytes based on the one of the format definitions.

9. The method of claim 7, wherein the deserializing further includes, for each of the at least one byte buffer, validating the extracted bytes based on the one of the format definitions.

10. The method of claim 1, wherein the record of format definitions is maintained on a server device of a data grid and a corresponding record of format definitions is maintained on a client device which serializes objects for storage in the data grid based on format definitions associated with the objects.

11. The method of claim 1, wherein the data grid operation is an access operation, and wherein performing the access operation includes:
either converting a key object of an access request, the access request including the key object and a first operation, to binary form based on one of the format definitions retrieved from the record of format definitions and associated with the key object, or retrieving the key object in the binary form,
generating a hash code based on the binary form of the key object, and
in response to determining that a data grid entry includes the key object based on at least the hash code:
  accessing a value object associated with the data grid entry; and
  performing the first operation using the accessed value object.

12. The method of claim 11, wherein the first operation is an update operation, and wherein performing the first operation includes:
storing an updated value object in a transactional grid entry;
if the updated value object is not in binary form, converting the updated value object to binary form based on one of the format definitions retrieved from the record of format definitions and associated with the key object;
storing the binary updated value object in the transactional grid entry; and
committing the transactional grid entry.

13. The method of claim 1, wherein the data grid operation is a querying operation, and wherein performing the querying operation includes:
generating a first query to execute against a data source of the data grid based on at least one of the format definitions retrieved from the record of format definitions and associated with a type of object indicated in a query request; and
executing the first query against the data source, wherein the executing includes retrieving one or more attribute values in binary form from the data grid without inflating one or more objects which include the one or more attribute values.

14. The method of claim 1, wherein the data grid operation is an indexing operation, and wherein performing the indexing operation includes:
retrieving one or more attribute values in binary form from a data source of the data grid based on at least one of the format definitions retrieved from the record of format definitions, wherein the retrieving does not inflate object(s) which include the one or more attribute values; and
inserting the retrieved attribute values in binary form into an index.

15. The method of claim 1, wherein the data grid operation includes comparing a given value with bytes from a byte range in a plurality of byte buffers stored in the data grid, the byte range corresponding to an attribute of one of the object classes specified in an associated format definition retrieved from the record of format definitions.

16. The method of claim 1, further comprising, building query metadata based on the new format definition.

17. A computer-implemented method for implementing custom object-in-memory formats in a data grid network appliance, comprising:
  maintaining a record of format definitions including static and dynamic configuration information, wherein the static configuration information includes format definitions for serializing objects of a respective class of object-oriented programming objects to byte buffers and deserializing the byte buffers and indicates one or more attributes of objects of the class and data types and byte ranges of the attributes, wherein the dynamic configuration information is associated with dynamic objects which each include one or more serializer methods called to perform serialization and deserialization of a respective class of objects;
  in response to identifying that an object being inserted into or updated in a data grid is of a new type not associated with any format definition in the record of format definitions, generating a new format definition for the new type of object based on at least one of configuration annotations or files specifying an associated serialization format and an inspection of the new type of object using reflection, wherein the new format definition is inserted into the record of format definitions; and
  performing, by operation of one or more computer processors, a data grid operation using one or more format definitions retrieved from the record of format definitions, wherein performing the data grid operation comprises:
    instantiating a dynamic object associated with a class and including a serializer method for serializing objects of the class;
    in response to receiving an object of the class, calling, based on the retrieved one or more format definitions, the serializer method of the dynamic object to serialize the received object to a binary byte buffer; and
    storing the binary byte buffer in the data grid and/or evaluating a query using the binary byte buffer.

18. The computer-implemented method of claim 17, wherein performing the data grid operation further comprises:
  interrogating the dynamic object, wherein the dynamic object is configured to return information specifying indexable and queryable attributes of the class, and
  converting the returned information to query metadata of a query catalog.

19. The computer-implemented method of claim 17, wherein the serializer method serializes the received object to the byte buffer by performing operations, including:
  extracting values of attributes from the object in a predefined order,
  converting the extracted values to binary bytes in either a compressed or an encrypted form, and
  appending the binary bytes to the binary byte buffer.

20. A computer-implemented method for implementing custom object-in-memory formats in a data grid network appliance, the computer-implemented method comprising:
  maintaining a record of format definitions including static and dynamic configuration information, wherein the static configuration information includes format definitions for serializing objects of respective classes of object-oriented programming objects to byte buffers and deserializing the byte buffers, each of the format definitions indicating one or more attributes of objects of a respective class and data types and byte ranges of the attributes, and wherein the dynamic configuration information is associated with dynamic objects which each include one or more serializer methods called to perform serialization and deserialization of a respective class of objects;
  in response to identifying that an object being inserted into or updated in a data grid is of a new type not associated with any format definition in the record of format definitions, generating a new format definition for the new type of object based on at least one of configuration annotations or files specifying an associated serialization format and an inspection of the new type of object using reflection, wherein the new format definition is inserted into the record of format definitions; and
  performing, by one or more computer processors when executing the program, a data grid operation using one or more format definitions retrieved from the record of format definitions and associated with a received object, wherein performing the data grid operation comprises:
    serializing the received object to a binary byte buffer based on the retrieved one or more format definitions or by calling a serializer method of one of the dynamic objects associated with the received object; and
    storing the binary byte buffer in a data grid and/or evaluating a query using the binary byte buffer.

* * * * *